US012518734B2

(12) United States Patent
Isozaki

(10) Patent No.: US 12,518,734 B2
(45) Date of Patent: Jan. 6, 2026

(54) VIBRATION SIGNAL GENERATION DEVICE

(71) Applicant: PIONEER CORPORATION, Tokyo (JP)

(72) Inventor: Kenta Isozaki, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 303 days.

(21) Appl. No.: 18/255,999

(22) PCT Filed: Dec. 23, 2021

(86) PCT No.: PCT/JP2021/047837

§ 371 (c)(1),
(2) Date: Jun. 5, 2023

(87) PCT Pub. No.: WO2022/153822

PCT Pub. Date: Jul. 21, 2022

(65) Prior Publication Data

US 2024/0105158 A1 Mar. 28, 2024

(30) Foreign Application Priority Data

Jan. 13, 2021 (JP) ................................ 2021-003489

(51) Int. Cl.
*G10K 15/04* (2006.01)

(52) U.S. Cl.
CPC .................................. *G10K 15/04* (2013.01)

(58) Field of Classification Search
CPC . G10K 15/04; G10K 2210/3044; H04R 5/023
USPC .................................................. 381/98, 3, 4
See application file for complete search history.

(56) References Cited

U.S. PATENT DOCUMENTS 5,113,852 A * 5/1992 Murtonen .......... A61H 23/0236 601/48
5,695,455 A 12/1997 Alton, Jr. et al.
8,280,087 B1 10/2012 Bacon et al.

(Continued)

FOREIGN PATENT DOCUMENTS

JP S60144377 U 9/1985
JP H01208099 A 8/1989

(Continued)

OTHER PUBLICATIONS

International Search Report for PCT/JP2021/047837, mailed Mar. 15, 2022, 5 pages.

(Continued)

*Primary Examiner* — Vivian C Chin
*Assistant Examiner* — Douglas J Suthers
(74) *Attorney, Agent, or Firm* — NIXON & VANDERHYE

(57) ABSTRACT

Vibration based on a sound is generated even in a case where the sound does not have a component of a low-frequency region. Envelope information regarding an envelope of a sound signal is derived, a frequency modulation and an amplitude modulation based on the envelope information are performed on a basic signal of waves having constant frequency and constant amplitude, and a vibration signal for vibrating a vibration generation device is generated.

11 Claims, 10 Drawing Sheets

(56) References Cited

U.S. PATENT DOCUMENTS

| | | | | |
|---|---|---|---|---|
| 2002/0025838 | A1* | 2/2002 | Kawamura .............. | G08B 6/00 455/567 |
| 2015/0156595 | A1* | 6/2015 | Zhong ...................... | H04R 3/12 381/326 |
| 2020/0211337 | A1 | 7/2020 | Grant et al. | |

FOREIGN PATENT DOCUMENTS

| | | | |
|---|---|---|---|
| JP | H03125598 | U | 12/1991 |
| JP | H07288887 | A | 10/1995 |
| JP | 2009003162 | A | 1/2009 |
| JP | 2019005142 | A | 1/2019 |
| JP | 2019113360 | A | 7/2019 |
| JP | 2020107320 | A | 7/2020 |

OTHER PUBLICATIONS

Written Opinion of the ISA for PCT/JP2021/047837, mailed Mar. 15, 2022, 3 pages.
Office Action, issued in Japanese Patent Application No. 2024-130868 dated Jun. 24, 2025.

* cited by examiner

VIBRATION SIGNAL GENERATION DEVICE

This application is the U.S. national phase of International Application No. PCT/JP2021/047837 filed Dec. 23, 2021 which designated the U.S. and claims priority to JP 2021-003489 filed Jan. 13, 2021, the entire contents of each of which are hereby incorporated by reference.

TECHNICAL FIELD

The present invention relates to a vibration signal generation device.

BACKGROUND ART

It is possible to cause a body to feel a sound by giving vibration generated based on the sound to the body. Since a frequency region of vibration which can be felt by a human being is a low-frequency region out of the frequency region which can be heard by the human being, conventionally, the low-frequency region of a sound signal is extracted and the vibration is generated based on a signal of the extracted low-frequency region (for example, Patent Document 1).

CITATION LIST

Patent Document

[Patent Document 1]: Japanese Unexamined Patent Application Publication No. H7-288887

SUMMARY OF THE INVENTION

Technical Problem

However, in a case of a sound without a component of a low-frequency region, it is not possible to generate vibration based on a sound by a method described above.

An example of the problems to be solved by the present invention is to generate vibration based on a sound even in a case of the sound without a component of a low-frequency region.

Solution to Problem

In order to solve the above problem, the invention according to claim 1 is a vibration signal generation device that generates a vibration signal to vibrate a vibration generation device, the vibration signal generation device including:

an envelope information derivation unit deriving envelope information regarding an envelope of a sound signal, and a vibration signal generation unit that performs a frequency modulation and an amplitude modulation based on the envelope information on a basic signal of waves having constant frequency and amplitude, and generates the vibration signal.

The invention defined in claim 8 is a vibration signal generation method executed by a computer to generate a vibration signal for vibrating a vibration generation device, the vibration signal generation method including:

an envelope information derivation step of deriving envelope information regarding an envelope of a sound signal, and a vibration signal generation step of performing a frequency modulation and an amplitude modulation based on the envelope information on a basic signal of waves having constant frequency and amplitude, and generating the vibration signal.

The invention according to claim 9 causes a computer to execute the vibration signal generation method according to claim 8.

The invention according to claim 10 stores the vibration signal generation program according to claim 9.

DESCRIPTION OF EMBODIMENTS

Figure 1:
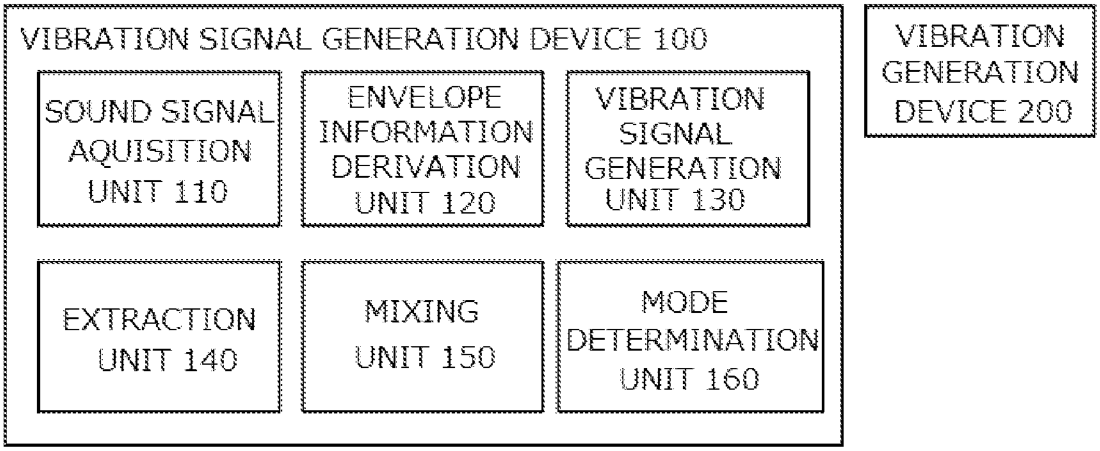
FIG. 1 is a diagram illustrating a vibration generation system according to one example of the present invention.

A vibration signal generation device according to one example of the present invention generates a vibration signal to vibrate a vibration generation device, the vibration signal generation device including: an envelope information derivation unit deriving envelope information regarding an envelope of a sound signal, and a vibration signal generation unit that performs a frequency modulation and an amplitude modulation based on the envelope information on a basic signal of waves having constant frequency and amplitude, and generates the vibration signal. Thus, in the present embodiment, even in a case of a sound without a component of a low-frequency region, it is possible to generate a vibration signal based on the sound. In addition, in the present embodiment, the frequency modulation is performed based on a level of the envelope of the sound signal. Therefore, frequency of the generated vibration signal changes corresponding to the level of the envelope. Thus, in the present embodiment, even in a case of the sound without the component of the low-frequency region, it is possible to generate a vibration which is not monotonous based on the sound.

The vibration signal generation device may further include: an extraction unit extracting a low-frequency component of the sound signal from the sound signal, and a mixing unit mixing a signal of the extracted low-frequency component in the vibration signal. This makes it possible to, in a case where there is the low-frequency component in the sound, give vibration of the low-frequency component of the sound signal to a listener of the sound, and as a result, it becomes possible to give a user vibration which has attack feeling and follows the sound more.

The vibration signal generation unit may perform the frequency modulation such that the frequency becomes higher as the level of the envelope becomes higher. This makes it possible to emphasize vibration having high frequency more than vibration having low frequency.

The vibration signal generation unit may perform the frequency modulation such that the frequency becomes lower as the level of the envelope becomes higher. This makes it possible to emphasize vibration having low frequency more than the vibration having high frequency.

The information processing device may further include a mode determination unit determining one mode from a plurality of modes, and the vibration signal generation unit may perform the frequency modulation based on the mode determined by the mode determination unit. This makes it possible to, for example, in a case where a plurality of modes regarding changes in a mental and physical state are prepared, give a user vibration which is appropriate to the mental and physical state.

The plurality of modes includes a first mode for a relaxation effect, and the vibration signal generation unit may perform the frequency modulation such that the frequency becomes lower as the level of the envelope becomes higher when the determined mode is the first mode. This makes it possible to emphasize the vibration having the low frequency more than the vibration having the high frequency. Thus, it becomes possible to cause a user to feel the vibration having the low frequency more, and allow the user to relax.

The plurality of modes includes a second mode for an awakening effect, and the vibration signal generation unit may perform the frequency modulation such that the frequency becomes higher as the level of the envelope becomes higher when the determined mode is the second mode. This makes it possible to emphasize the vibration having the high frequency more than the vibration having the low frequency. Thus, it becomes possible to cause the user to feel the vibration having the high frequency more, and awaken the user.

Further, a vibration signal generation method according to the one embodiment of the present invention is the vibration signal generation method executed by a computer to generate the vibration signal to vibrate the vibration generation device, the vibration signal generation method including: an envelope information derivation step of deriving the envelope information regarding the envelope of the sound signal, and a vibration signal generation step of performing the frequency modulation and the amplitude modulation based on the envelope information on the basic signal of the waves having constant frequency and amplitude, and generating the vibration signal. Thus, in the present embodiment, even in a case of the sound without the component of the low-frequency region, it is possible to generate the vibration signal based on the sound. In addition, in the present embodiment, the frequency modulation is performed based on the level of the envelope of the sound signal. Therefore, the frequency of the generated vibration signal changes corresponding to the level of the envelope. Thus, in the present embodiment, even in the case of the sound without the component of the low-frequency region, it is possible to generate the vibration which is not monotonous based on the sound.

In addition, a vibration signal generation program according to the one embodiment of the present invention causes a computer to execute the vibration signal generation method described above. Thus, in the present embodiment, even in a case of the sound without the component of the low-frequency region, it is possible to generate the vibration signal based on the sound by the computer.

Further, a computer-readable storage medium according to the one embodiment of the present invention stores the vibration signal generation program described above. Therefore, in the present embodiment, in addition to being distributed as a device incorporating the vibration signal generation program described above, it can be distributed alone, which facilitates version upgrade or the like.

Example

<Vibration Generation System>

FIG. 1 is a diagram illustrating a vibration signal generation system according to one example of the present invention. The vibration generation system includes a vibration signal generation device 100 and a vibration generation device 200. The vibration signal generation device 100 generates a vibration signal based on a sound signal, and the vibration generation device 200 generates vibration based on the vibration signal generated by the vibration signal generation device 100.

The vibration signal generation device 100 is constituted of a computer including a CPU or the like, and includes a sound signal acquisition unit 110, an envelope information derivation unit 120, and a vibration signal generation unit 130.

The sound signal acquisition unit 110 acquires the sound signal. For example, the sound signal acquisition unit 110 may acquire the sound signal by receiving an input of the sound signal outputted from another device, or may acquire the sound signal by acquiring sound data stored in a storage device, a storage medium such as CD, or cloud or the like and generating the sound signal from the acquired sound data.

Figure 2:
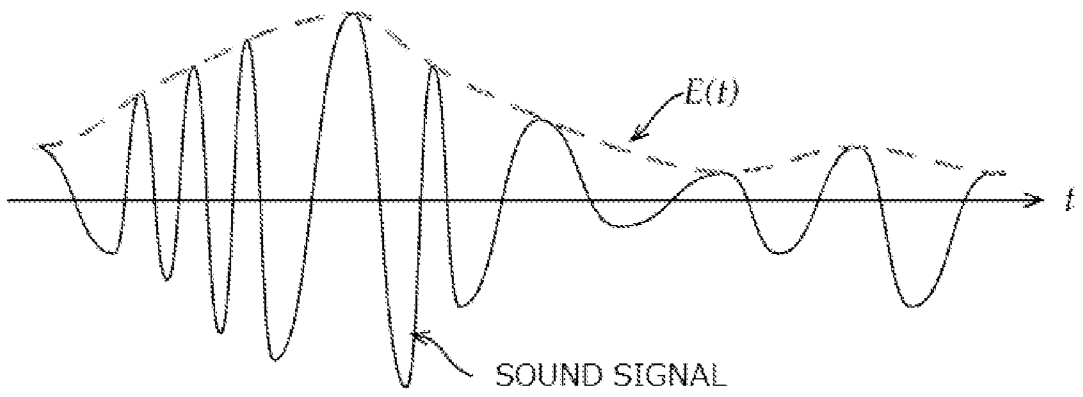
FIG. 2 is a diagram explaining an envelope E(t) of a sound signal.

The envelope information derivation unit 120 derives envelope information regarding an envelope of a sound signal acquired by the sound signal acquisition unit 110. The envelope information derivation unit 120 derives the envelope of the sound signal as, for example, a function of time $E(t)$ as shown in FIG. 2. As a method to derive an envelope of a signal, for example, there is a peak hold processing or an absolute value averaging.

The vibration signal generation unit 130 performs a frequency modulation and an amplitude modulation based on the envelope information acquired by the envelope information derivation unit 120 on a basic signal of waves having constant frequency and amplitude, generates the vibration signal, and outputs the vibration signal to the vibration generation device 200. At this time, the vibration signal generation unit 130 performs the frequency modulation such that the frequency of the generated vibration signal becomes a value in a low-frequency region (for example, 20 Hz to 100 Hz).

Abasic vibration is, for example, a sine wave ($A\sin(\omega t)$) having constant frequency $\omega$ and constant amplitude A. The vibration signal generation unit 130 generates a vibration signal ($E(t)\sin(\Omega(E(t))t)$) by, for example, causing the frequency $\omega$ of this basic vibration to change based on a level of an envelope ($E(t)$) (frequency modulation based on envelope information: $\omega=\Omega(E(t))$), and causing the amplitude A to change to match the envelope (amplitude modulation based on envelope information: $A=E(t)$).

Figure 3A:
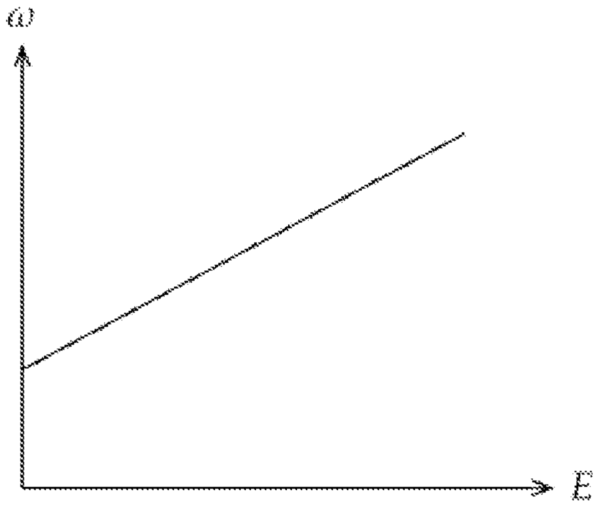
FIG. 3A is a diagram explaining a relationship between a level of an envelope and frequency.
Figure 4A:
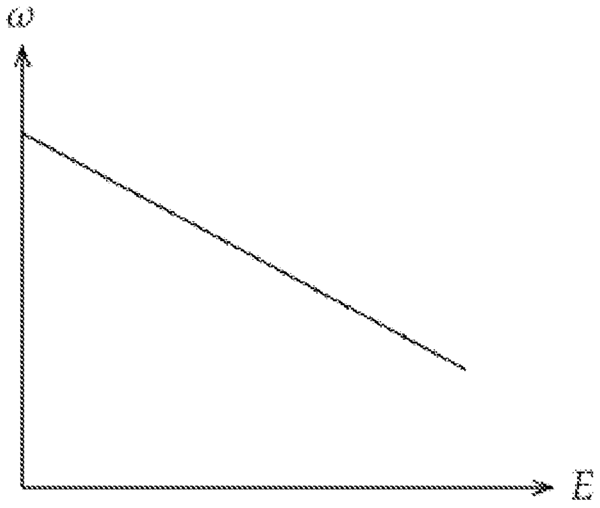
FIG. 4A is a diagram explaining a relationship between a level of an envelope and frequency.

At this time, the vibration signal generation unit 130 may perform the frequency modulation such that the frequency becomes higher as a level of the envelope becomes higher (that is, $d\omega/dE>0$) as shown in FIG. 3A. Further, as shown in FIG. 4A, the vibration signal generation unit 130 may perform the frequency modulation such that the frequency becomes lower as the level of the envelope becomes higher (that is, dω)/dE<0). Note that, in FIG. 3A and FIG. 4A, a relationship between the level of the envelope and the frequency of the envelope is linear, however, the relationship between the level of the envelope and the frequency of the envelope is not limited to being linear.

Figure 3B:
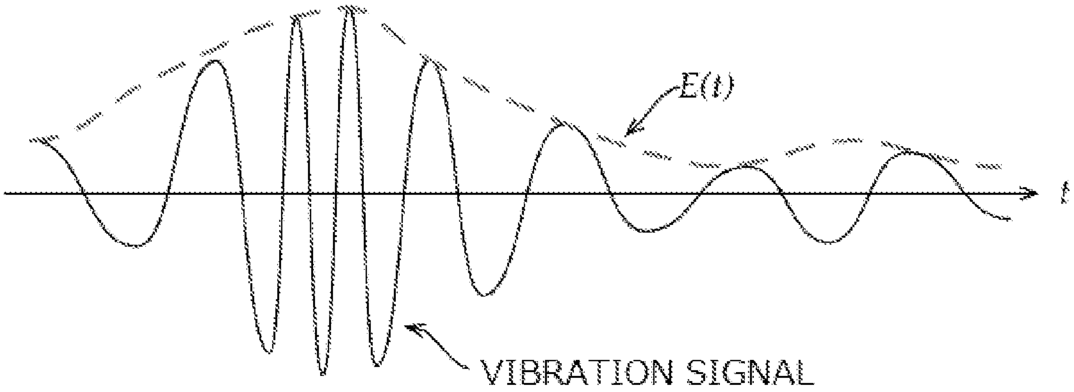
FIG. 3B is a diagram explaining a generated vibration signal.
Figure 4B:
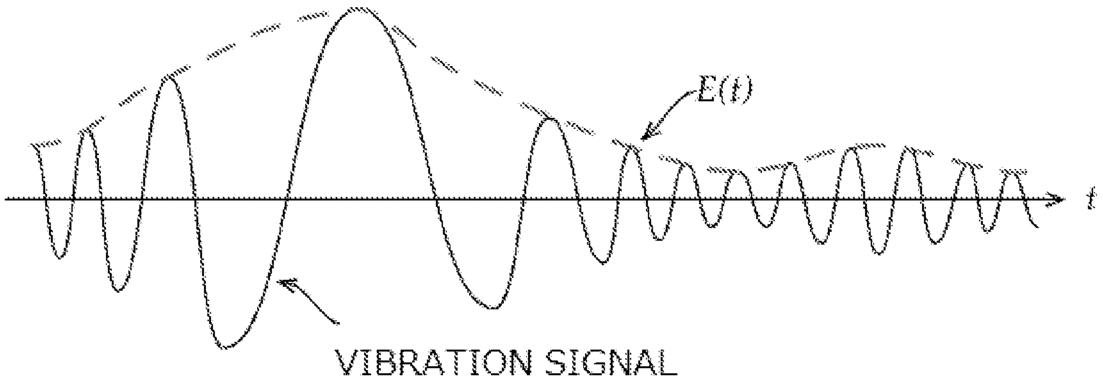
FIG. 4B is a diagram explaining a generated vibration signal.

In a case where the frequency modulation is performed such that the frequency becomes higher as the level of the envelope becomes higher, the vibration signal generated by the vibration signal generation unit 130 becomes dense at a portion at which the level of the envelope is high, and becomes sparse at a portion at which the level of the envelope is low, as shown in FIG. 3B. On the other hand, in a case where the frequency modulation is performed such that the frequency becomes lower as the level of the envelope becomes higher, the vibration signal generated by the vibration signal generation unit 130 becomes sparse at the portion at which the level of the envelope is high, and becomes dense at the portion at which the level of the envelope is low, as shown in FIG. 4B.

The vibration generation device 200 is a device which generates vibration based on an inputted vibration signal, and gives the vibration based on the vibration signal to a user. The vibration generation device 200 is embedded in, for example, a seat on which the user can sit. In addition, the vibration generation device 200 may be installed in a sitting cushion. The user can feel the vibration by sitting on the sitting cushion or placing the sitting cushion between the back of the user and a backrest. In addition, the vibration generation device 200 may be installed in a pouch. The user can feel the vibration by applying the pouch to a portion of a body such as a hand, a stomach, a chest, and a leg or the like.

In this manner, in the present example, the vibration signal is generated based on the envelope of the sound signal. Therefore, even in a case of a sound without a component of the low-frequency region, it is possible to generate the vibration signal based on this sound. In addition, in the present example, the frequency modulation is performed based on a level of the envelope of the sound signal. Therefore, the frequency of the generated vibration signal changes corresponding to the level of the envelope. Thus, in the present example, even in the case of the sound without the component of the low-frequency region, it is possible to generate vibration which is not monotonous based on this sound.

For example, in the present example, even a person having weak hearing becomes capable of feeling the sound with the vibration. For example, in the present example, when a piece of music is being played, even the person having weak hearing can receive vibration which corresponds to a change in sound volume of the piece of music, and can experience an atmosphere of the piece of music. In addition, in the present example, while watching a play, even the person having weak hearing can receive vibration in which intonation of lines uttered by an actor is reproduced, and can experience an atmosphere of the play more.

Figure 5:
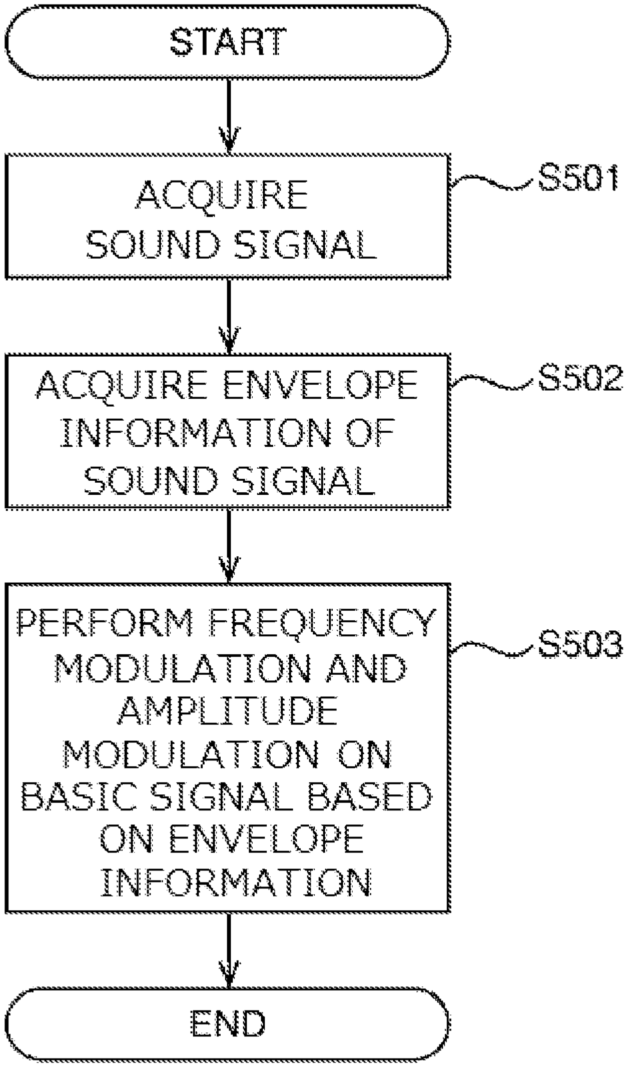
FIG. 5 is a diagram illustrating one example of a processing operation in a vibration signal generation device 100 according to one example of the present invention.

FIG. 5 is a diagram illustrating one example of a processing operation in the vibration signal generation device 100 according to the one example of the present invention. The sound signal acquisition unit 110 acquires the sound signal (step S501). The envelope information derivation unit 120 derives the envelope information regarding the envelope of the sound signal acquired by the sound signal acquisition unit 110 (step S502). The vibration signal generation unit 130 performs the frequency modulation and the amplitude modulation based on the envelope information acquired by the envelope information derivation unit 120 on the basic signal of the waves having constant frequency and constant amplitude, and generates the vibration signal (step S503).

<Sound Output/Vibration Generation System>

Figure 6:
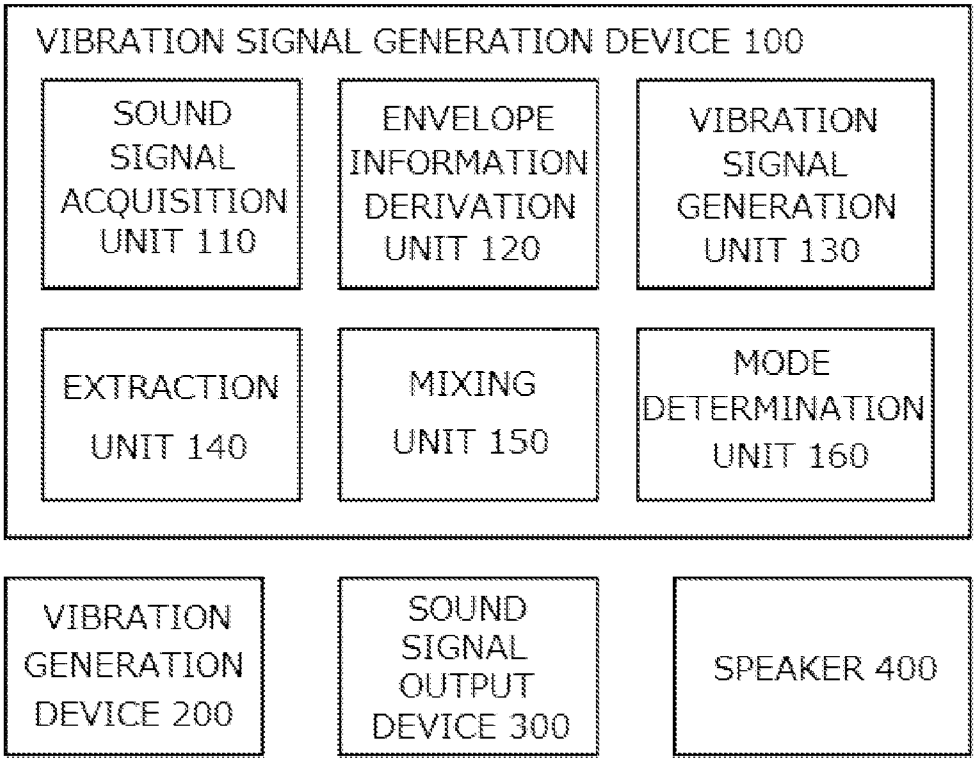
FIG. 6 is a diagram illustrating a sound output/vibration generation system according to one example of the present invention.

FIG. 6 is a diagram illustrating a sound output/vibration generation system according to the one example of the present invention. The sound output/vibration generation system illustrated in FIG. 7 further includes a sound signal output device 300 and a speaker 400 in addition to the vibration signal generation device 100 and the vibration generation device 200. In this sound output/vibration generation system, the sound signal output device 300 outputs a sound of the sound signal by a speaker 300, and the vibration signal generation device 100 generates the vibration signal based on this sound signal, and the vibration generation device 200 generates the vibration based on this vibration signal. Thus, in the present example, it is possible to cause the user to listen to the sound and give the vibration based on this sound to the user.

<Mixing of Low-Frequency Component>

In a case where there is the low-frequency component in the sound, by giving vibration of a low-frequency component of a sound signal to a listener of the sound, it is possible to give the user the vibration which has attack feeling and follows the sound more. Then, the vibration signal generation device 100 may include an extraction unit 140 extracting the low-frequency component (for example, 20 Hz to 100 Hz) of the sound signal from the sound signal, and a mixing unit 150 mixing the signal of the low-frequency component extracted by the extraction unit 140 in the vibration signal generated by the vibration signal generation unit 130.

<Relaxation Effect/Awakening Effect>

The inventor has found that, when a user is listening to a piece of music and vibration of a lower frequency region of a frequency region which can be felt by a human being is given to the user, the parasympathetic nervous system of the user becomes more active, which means that the user becomes more relaxed. Further, the inventor has found that, when a user is listening to the piece of music and the vibration of a higher frequency band of the frequency region which can be felt by the human being is given to the user, the sympathetic nervous system of the user becomes more active, which means that the user becomes more awake.

Then, the vibration signal generation device 100 may further include a mode determination unit 160 that determines one mode from a plurality of modes related to changes in the mental and physical state. Then, the vibration signal generation unit 130 of the vibration signal generation device 100 may perform the frequency modulation based on the mode determined by the mode determination unit 160.

The plurality of modes may include a healing mode (first mode) for relaxing the user. Then, when the mode determined by the mode determination unit 160 is the healing mode, the vibration signal generation unit 130 may perform the frequency modulation such that the frequency becomes lower as the level of the envelope becomes higher, as shown in FIG. 4A. This makes it possible to emphasize the vibration having the low frequency more than the vibration having the high frequency. Thus, it becomes possible to cause the user to feel the vibration having the low frequency more, and allow the user to relax.

The plurality of modes may include an awakening mode (second mode) for awakening the user. Then, when the mode determined by the mode determination unit 160 is the awakening mode, the vibration signal generation unit 130 may perform the frequency modulation such that the frequency becomes higher as the level of the envelope becomes higher, as shown in FIG. 3A. This makes it possible to emphasize the vibration having the high frequency more than the vibration having the low frequency. Thus, it becomes possible to cause the user to feel the vibration having the high frequency more, and make the user awake.

Further, the plurality of modes may include a normal mode (third mode) that is not intended for the relaxation effect and the awakening effect.

Figure 7A:
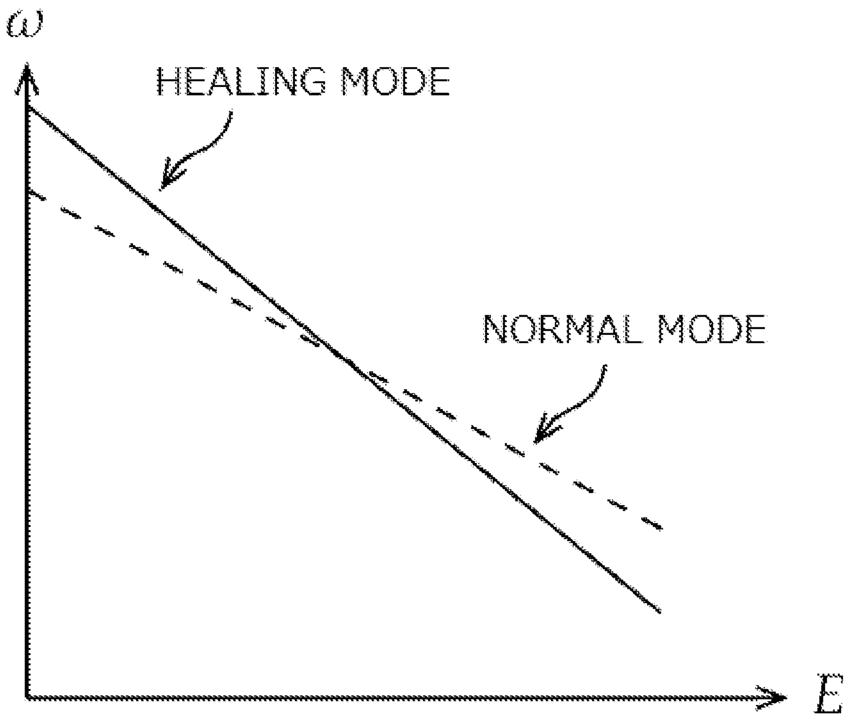
FIG. 7A is a diagram explaining a relationship between a level of an envelope and frequency.

In a case where the frequency modulation is performed such that the frequency becomes lower as the level of the envelope becomes higher in the normal mode, when the mode determined by the mode determination unit 160 is the relaxing mode, the vibration signal generation unit 130 may perform the frequency modulation such that the frequency becomes drastically lower than in the normal mode as the level of the envelope becomes higher, as shown in FIG. 7A. This makes it possible to emphasize the vibration having the low frequency more than the vibration having the high frequency in the healing mode in comparison with the normal mode. Thus, it becomes possible to cause the user to feel the vibration having the low frequency more, and make the user more relaxed.

Figure 7B:
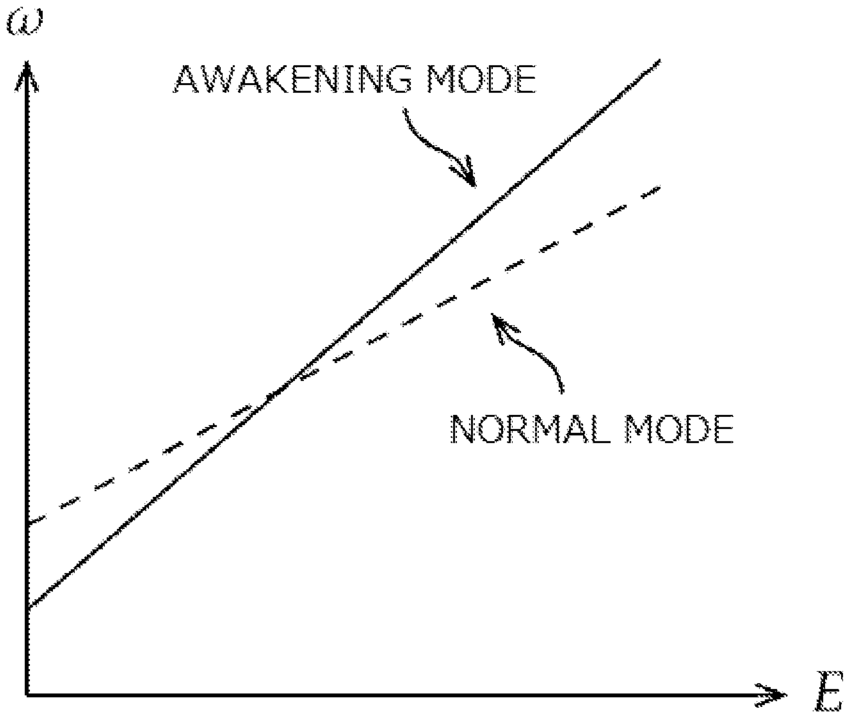
FIG. 7B is a diagram explaining a relationship between a level of an envelope and frequency.

In a case where the frequency modulation is performed such that the frequency becomes higher as the level of the envelope becomes higher in the normal mode, when the mode determined by the mode determination unit 160 is the awakening mode, the vibration signal generation unit 130 may perform the frequency modulation such that the frequency becomes drastically higher in the awakening mode than in the normal mode as the level of the envelope becomes higher as shown in FIG. 7B. This makes it possible to emphasize the vibration having the high frequency more than the vibration having the low frequency in the awakening mode in comparison with the normal mode. Thus, it becomes possible to cause the user to feel the vibration having the high frequency more, and make the user more awake.

The inventor also has found that, when a user is listening to a piece of music, and a vibration based on this piece of music is not synchronized with the piece of music and given to the user at a timing delayed from the piece of music, the parasympathetic nervous system of the user becomes active, which means that the user becomes relaxed. The inventor has also found that, when a user is listening to a piece of music, and vibration based on this piece of music is not synchronized with the piece of music and given to the user at a timing ahead of the piece of music, the sympathetic nervous system of the user becomes active, which means that the user becomes awake.

Then, the envelope information derivation unit 120 of the vibration signal generation device 100 may derive the envelope based on the mode determined by the mode determination unit 160.

The envelope information derivation unit 120 may derive the envelope information regarding the envelope of the sound signal for example by peak hold processing using, peak hold time which is based on the mode determined by the mode determination unit 160. At this time, peak hold time with respect to the first mode may be made longer than peak hold time with respect to the normal mode, and peak hold time with respect to the second mode may be made shorter than the peak hold time with respect to the normal mode. This makes it possible to cause the user to feel that vibration is delayed from a sound in the healing mode in comparison with the normal mode, and it becomes possible to make the user more relaxed. On the other hand, it is possible to cause the user to feel that the vibration is advancing ahead of the sound in the awakening mode in comparison with the normal mode, and it becomes possible to make the user more awake.

The envelope information derivation unit 120 may derive the envelope of the sound signal for example by the absolute value averaging using average time based on the determined mode. At this time, average time with respect to the first mode may be made longer than average time with respect to the normal mode, and average time with respect to the second mode may be made shorter than the average time with respect to the normal mode. This also makes it possible to cause the user to feel that the vibration is delayed from the sound in the healing mode in comparison with the normal mode, and it becomes possible to make the user more relaxed. In addition, it is possible to cause the user to feel that the vibration is advancing ahead of the sound in the awakening mode in comparison with the normal mode, and it becomes possible to make the user more awake.

The mode determination unit 160 preferably determines the mode based on, for example, the user's input. Further, for example, the vibration signal generation device 100 preferably includes a means for receiving an input from the user. In addition, the vibration signal generation device 100 may include a means for acquiring characteristics of the sound, and the mode determination unit 160 may perform determination of the mode based on the characteristics of the sound. In addition, the vibration signal generation device 100 may further include a means for learning an effect the user wishes to obtain by playing a sound by machine learning, and the mode determination unit 160 may determine the mode based on the learning results.

In addition, the vibration signal generation device 100 may further include a means for acquiring biometric information of the user, and the mode determination unit 160 may determine the mode based on the acquired biometric information. Further, as biometric information of the user, information regarding a heartbeat of the user may be acquired as the biometric information of the user. Information related to the heartbeat of the user may include information related to the heart rate of the user and the heart rate variability of the user (for example, the low frequency (LF) and high frequency (HF) of the heart rate variability, and LF/HF which is the ratio between LF and HF). It is possible to know the mental and physical state from the information related to the heart rate and heart rate variability. For example, when the user is relaxed, the heart rate is low, and when the user is awake, the heart rate is high. Then, for example, when the biometric information indicates that the user is relaxed, the mode determination unit 160 may determine the mode to be the awakening mode to awaken the user, and when the biometric information indicates that the user is awake, the mode determination unit 160 may determine the mode to be the healing mode to relax the user.

The present invention has been described above with reference to preferred embodiments of the present invention. Although the present invention has been described with reference to specific examples, various modifications and changes can be made to these specific examples without departing from the spirit and scope of the present invention specified in the claims.

REFERENCE SIGNS LIST

100 vibration signal generation device
110 sound signal acquisition unit

120 envelope information derivation unit
130 vibration signal generation unit
140 extraction unit
150 mixing unit
160 mode determination unit
200 vibration generation device
300 sound signal output device
400 speaker

The invention claimed is:

1. A vibration signal generation device that generates a vibration signal to vibrate a vibration generation device, the vibration signal generation device comprising:
- an envelope information derivation unit deriving envelope information regarding an envelope of a sound signal,
- a vibration signal generation unit that performs a frequency modulation and an amplitude modulation based on the envelope information on a basic signal of waves having constant frequency and constant amplitude, and generates the vibration signal,
- an extraction unit extracting a low-frequency component of the sound signal from the sound signal, and
- a mixing unit mixing a signal of the extracted low-frequency component in the vibration signal.

2. The vibration signal generation device according to claim 1, further comprising a mode determination unit determining one mode from a plurality of modes,
- wherein the vibration signal generation unit performs the frequency modulation based on the mode determined by the mode determination unit,
- wherein the plurality of modes comprises a first mode for a relaxation effect, and
- wherein the vibration signal generation unit performs the frequency modulation such that frequency becomes lower as a level of the envelope becomes higher when the determined mode is the first mode.

3. The vibration signal generation device according to claim 2,
- wherein the plurality of modes comprises a second mode for an awakening effect, and
- wherein the vibration signal generation unit performs the frequency modulation such that frequency becomes higher as a level of the envelope becomes higher when the determined mode is the second mode.

4. The vibration signal generation device according to claim 1, further comprising a mode determination unit determining one mode from a plurality of modes,
- wherein the vibration signal generation unit performs the frequency modulation based on the mode determined by the mode determination unit,
- wherein the plurality of modes comprises a second mode for an awakening effect, and
- wherein the vibration signal generation unit performs the frequency modulation such that frequency becomes higher as a level of the envelope becomes higher when the determined mode is the second mode.

5. The vibration signal generation device according to claim 1,
- wherein the vibration signal generation unit performs the frequency modulation such that frequency becomes higher as a level of the envelope becomes higher.

6. The vibration signal generation device according to claim 1,
- wherein the vibration signal generation unit performs the frequency modulation such that frequency becomes lower as a level of the envelope becomes higher.

7. The vibration signal generation device according to claim 1, further comprising a mode determination unit determining one mode from a plurality of modes,
- wherein the vibration signal generation unit performs the frequency modulation based on the mode determined by the mode determination unit.

8. The vibration signal generation device according to claim 7,
- wherein the plurality of modes comprises a first mode for a relaxation effect, and
- wherein the vibration signal generation unit performs the frequency modulation such that frequency becomes lower as a level of the envelope becomes higher when the determined mode is the first mode.

9. The vibration signal generation device according to claim 7,
- wherein the plurality of modes comprises a second mode for an awakening effect, and
- wherein the vibration signal generation unit performs the frequency modulation such that frequency becomes higher as a level of the envelope becomes higher when the determined mode is the second mode.

10. A vibration signal generation device that generates a vibration signal to vibrate a vibration generation device, the vibration signal generation device comprising:
- an envelope information derivation unit deriving envelope information regarding an envelope of a sound signal, and
- a vibration signal generation unit that performs a frequency modulation and an amplitude modulation based on the envelope information on a basic signal of waves having constant frequency and constant amplitude, and generates the vibration signal,
- wherein the vibration signal generation unit performs the frequency modulation such that frequency becomes higher as a level of the envelope becomes higher.

11. A vibration signal generation device that generates a vibration signal to vibrate a vibration generation device, the vibration signal generation device comprising:
- an envelope information derivation unit deriving envelope information regarding an envelope of a sound signal, and
- a vibration signal generation unit that performs a frequency modulation and an amplitude modulation based on the envelope information on a basic signal of waves having constant frequency and constant amplitude, and generates the vibration signal,
- wherein the vibration signal generation unit performs the frequency modulation such that frequency becomes lower as a level of the envelope becomes higher.

* * * * *